(12) United States Patent
Suzuki et al.

(10) Patent No.: US 10,849,328 B2
(45) Date of Patent: Dec. 1, 2020

(54) BREAD CONVEYING APPARATUS

(71) Applicant: Oshikiri Machinery Ltd., Fujisawa (JP)

(72) Inventors: Nobuhiro Suzuki, Fujisawa (JP); Hiroshi Noda, Fujisawa (JP); Ryuji Sasaki, Fujisawa (JP)

(73) Assignee: OSHIKIRI MACHINERY LTD., Fujisawa (JP)

( * ) Notice: Subject to any disclaimer, the term of this patent is extended or adjusted under 35 U.S.C. 154(b) by 274 days.

(21) Appl. No.: 15/842,393

(22) Filed: Dec. 14, 2017

(65) Prior Publication Data

US 2018/0255790 A1 Sep. 13, 2018

(30) Foreign Application Priority Data

Mar. 10, 2017 (JP) .................. 2017-045513

(51) Int. Cl.
| | |
|---|---|
| *A21C 9/08* | (2006.01) |
| *A21B 5/02* | (2006.01) |
| *A21B 3/07* | (2006.01) |
| *A21B 1/48* | (2006.01) |
| *A21B 1/46* | (2006.01) |

(52) U.S. Cl.
CPC ................ *A21C 9/08* (2013.01); *A21B 1/48* (2013.01); *A21B 3/07* (2013.01); *A21B 5/02* (2013.01); *A21B 1/46* (2013.01)

(58) Field of Classification Search
CPC .... A21C 9/08; A21B 5/02; A21B 3/07; A21B 1/48; A21B 1/46; A21B 3/18; B65G 25/06; B65G 47/34

USPC ........... 99/373, 386, 391, 393, 443 R, 443 C
See application file for complete search history.

(56) References Cited

U.S. PATENT DOCUMENTS

| | | | | |
|---|---|---|---|---|
| 2,038,028 | A | * | 4/1936 | De Mattels ......... A47J 37/0857 99/386 |
| 2,238,698 | A | * | 4/1941 | Knaust ..................... A21B 5/02 99/373 |
| 2,540,766 | A | | 2/1951 | Stilwell et al. |
| 2,640,445 | A | | 6/1953 | Reget |

(Continued)

FOREIGN PATENT DOCUMENTS

| | | |
|---|---|---|
| CN | 200988593 Y | 12/2007 |
| FR | 2950615 A1 | 4/2011 |

(Continued)

OTHER PUBLICATIONS

Search Report dated Mar. 29, 2018 in corresponding Great Britain Application No. 1720133.6.

(Continued)

*Primary Examiner* — Sarang Afzali
*Assistant Examiner* — Darrell C Ford
(74) *Attorney, Agent, or Firm* — McGinn I.P. Law Group, PLLC

(57) ABSTRACT

A bread conveying apparatus for conveying bread, includes a conveyor device that has a container on which the bread is placed, and that conveys the container in a conveying direction; a guide member disposed on a downstream end portion side of the conveyor device in the conveying direction to releasably support the bread in cooperation with the container; and a chute member that discharges the bread conveyed by the conveyor device.

10 Claims, 6 Drawing Sheets

(56) References Cited

U.S. PATENT DOCUMENTS

| | | | | |
|---|---|---|---|---|
| 2,786,430 | A | * | 3/1957 | Robbins ................... A21B 5/02 |
| | | | | 99/427 |
| 2,859,713 | A | | 11/1958 | Noel |
| 3,400,651 | A | * | 9/1968 | Hatch ................. A47J 37/0857 |
| | | | | 99/331 |
| 3,418,920 | A | * | 12/1968 | Alexander ............ A47J 37/045 |
| | | | | 99/386 |
| 3,933,236 | A | | 1/1976 | Aterianus et al. |
| 4,261,257 | A | * | 4/1981 | Henderson .......... A47J 37/0857 |
| | | | | 99/349 |
| 4,286,509 | A | * | 9/1981 | Miller ................. A47J 37/0857 |
| | | | | 219/388 |
| 4,776,789 | A | | 10/1988 | Ehrich |
| 6,311,610 | B1 | * | 11/2001 | Kettman ............. A47J 37/0857 |
| | | | | 219/388 |
| 7,264,107 | B2 | * | 9/2007 | Lawrence ................ A21C 9/08 |
| | | | | 198/404 |
| 2020/0037820 | A1 | * | 2/2020 | Vega ..................... A47J 37/044 |

FOREIGN PATENT DOCUMENTS

| | | |
|---|---|---|
| GB | 1198714 | 7/1970 |
| JP | S61-91116 U | 6/1986 |
| JP | H10-257984 A | 9/1998 |

OTHER PUBLICATIONS

Chinese Office Action, dated Jul. 13, 2020, in Chinese Application No. 201810163741.X.

Japanese Office Action dated Oct. 13, 2020, in Japanese Application No. 2017-045513 and English Translation thereof.

* cited by examiner

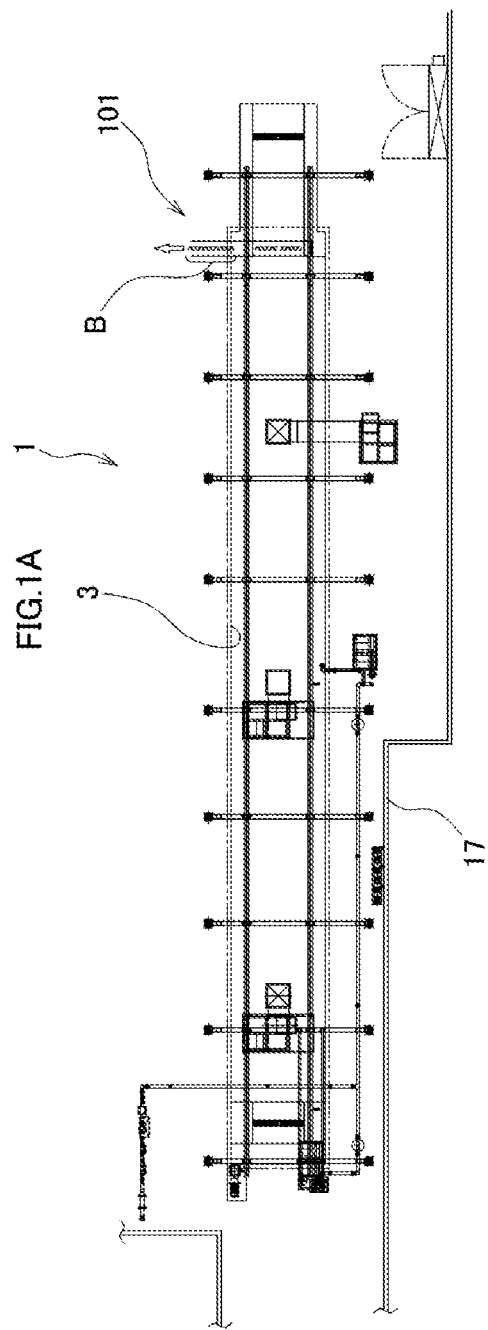
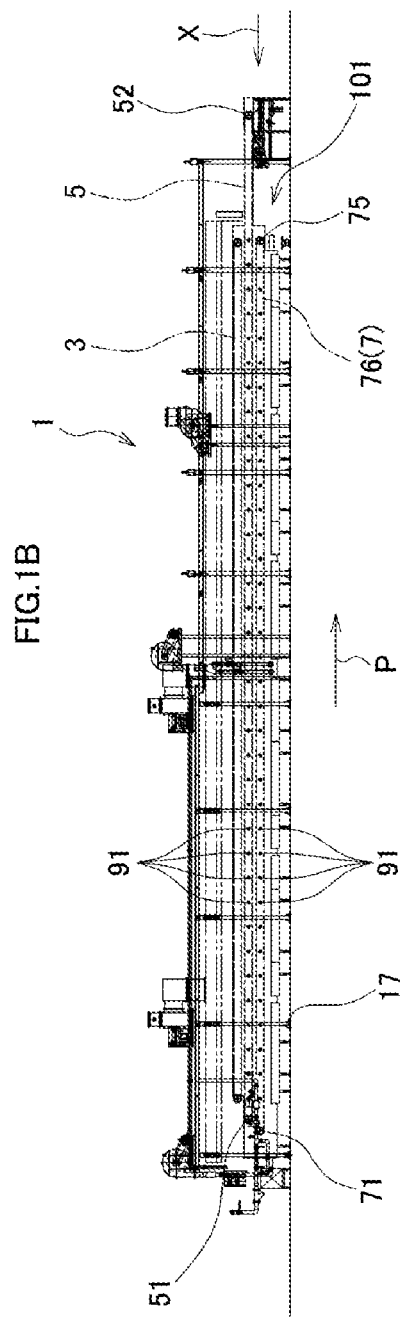

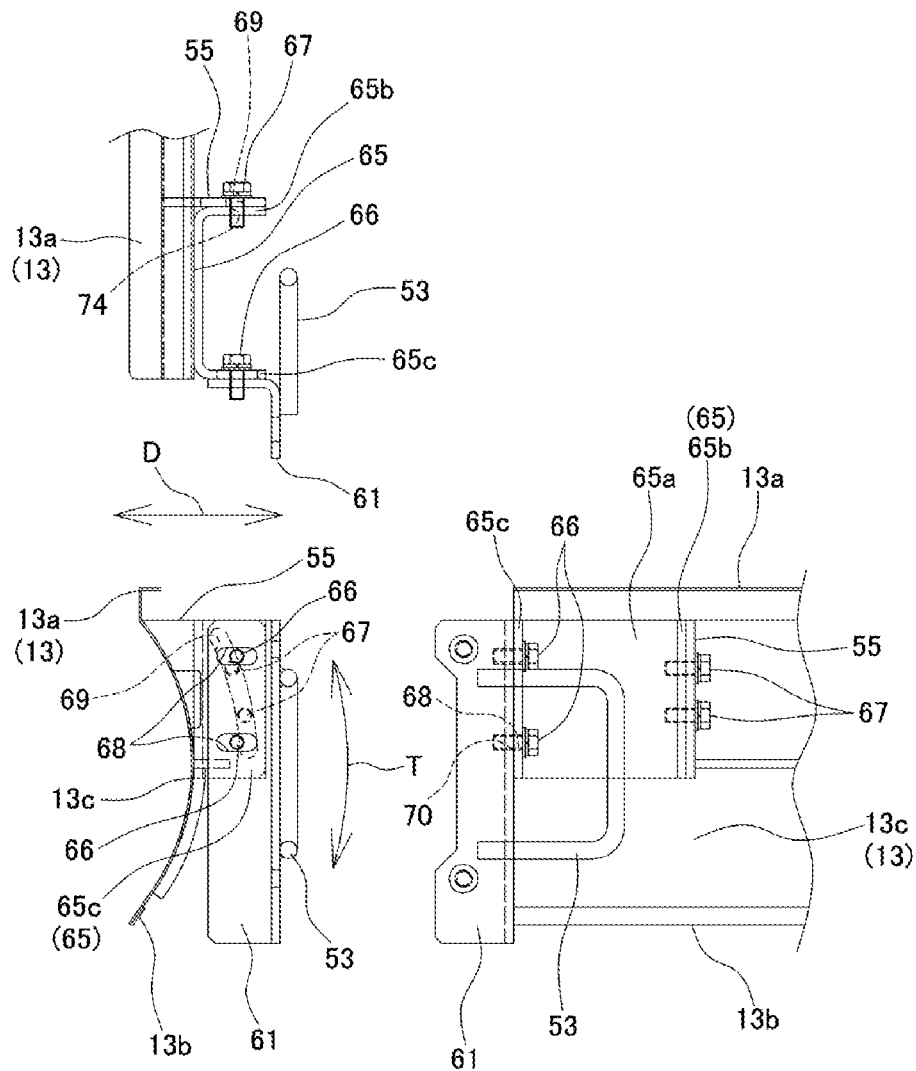

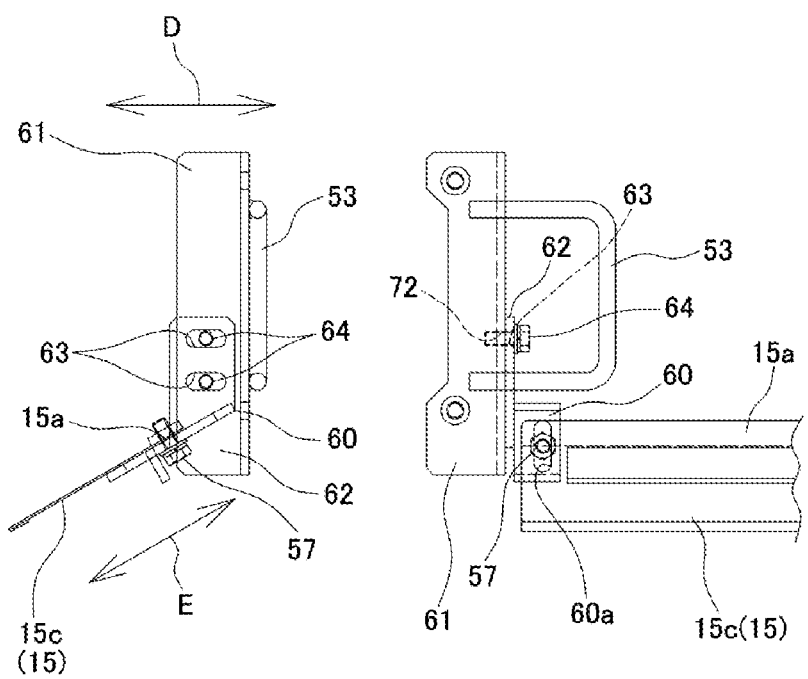

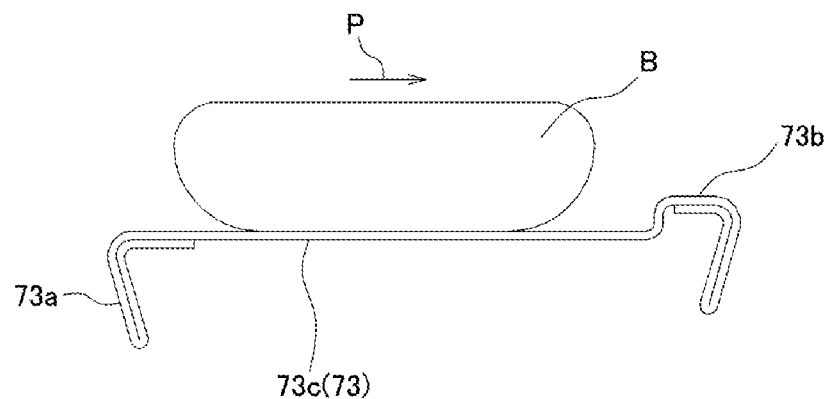
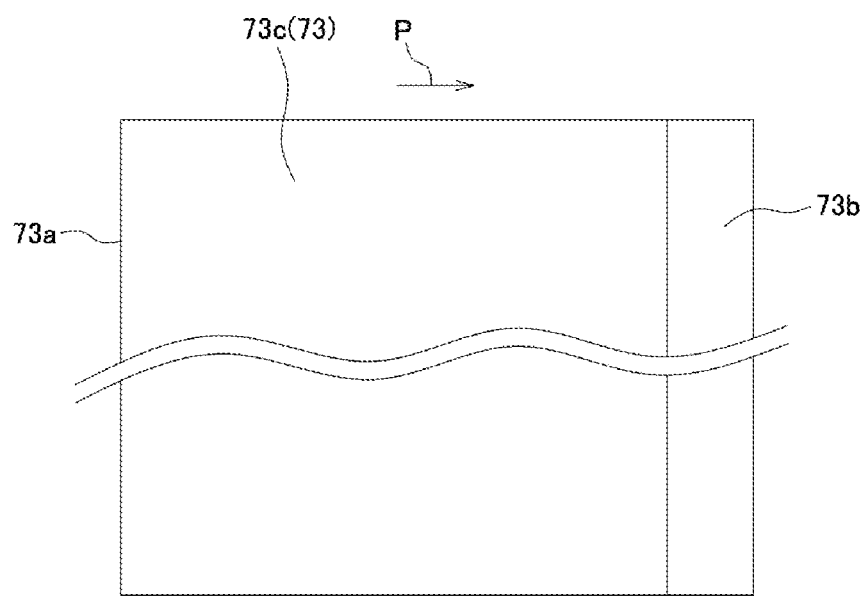

BREAD CONVEYING APPARATUS

BACKGROUND OF THE INVENTION

Field of the Invention

The present invention relates to a bread conveying apparatus for conveying bread such as plain bread or pastry.

Description of the Related Art

Bread such as plain bread or pastry is produced through a series of manufacturing processes. In a proofer process which is one process in a manufacturing process, a dough lump of bread (hereinafter referred to as bread dough) is fermented by a proofer device. In a subsequent hearth process, the fermented bread dough is baked by a griddle device which is a bread baking apparatus. Baked bread is transferred to conveying means for transportation to a subsequent process by a bread conveying apparatus included in the griddle device.

U.S. Pat. No. 2,859,713 discloses an example of the griddle device. This griddle device has a configuration in which bread dough is placed on a hearth connected to an endless belt included in a carrier conveyor, the bread dough is baked while being conveyed, and the bread dough is transferred from a placed portion to a discharge conveyor at a downstream end portion in a conveying direction of the endless belt.

A bread conveying apparatus of U.S. Pat. No. 2,859,713 has a configuration in which the bread dough placed on the hearth connected to the endless belt falls freely onto a placed portion included in the discharge conveyor. Therefore, in some cases, the bread dough is placed on a place different from a predetermined position on the placed portion of the discharge conveyor, or pieces of bread dough collide with each other to cause a scratch on the bread dough to generate when the pieces of bread dough continuously fall.

SUMMARY OF THE INVENTION

The invention has been conceived in view of the above circumstances. That is, an object is to provide a bread conveying apparatus capable of transferring conveyed bread to a predetermined position.

In a manufacturing process of bread, in general, a baked article is referred to as bread, and an article to be baked is referred to as bread dough. Therefore, in the present specification, a product to be baked, having a portion baked in a conveying course by a cup plate conveyor or a hearth plate conveyor is referred to as bread dough, and a product which is (two surfaces of which are) baked in the conveying course by the hearth plate conveyor is referred to as bread.

To solve the above problem and to achieve an object, a first aspect of the invention is a bread conveying apparatus for conveying bread, includes: a conveyor device that has a container on which the bread is placed, and that conveys the container in a conveying direction;

a guide member disposed on a downstream end portion side of the conveyor device in the conveying direction to releasably support the bread in cooperation with the container; and a chute member that discharges the bread conveyed by the conveyor device.

According to a bread conveying apparatus of the invention, timing at which a restraint of bread by a container and a guide member is released and the bread is transferred to a chute member may be set, and thus the bread may be accurately transferred to a predetermined position.

Further features of the present invention will become apparent from the following description of exemplary embodiments with reference to the attached drawings.

BRIEF DESCRIPTION OF THE DRAWINGS

FIG. 1A is a plan view of a bread baking apparatus corresponding to an embodiment of the invention, and FIG. 1B is a front view of the bread baking apparatus corresponding to the embodiment of the invention;

FIG. 4A is a front view of a guide member, FIG. 4B is a side view illustrating a portion of the guide member, and FIG. 4C is a plan view illustrating a portion of the guide member;

FIG. 5A is a front view of a chute member, and FIG. 5B is a partial side view of the chute member; and FIG. 6A is a front view of a hearth plate, and FIG. 6B is a plan view of the hearth plate.

DESCRIPTION OF THE EMBODIMENTS

Figure 2A:
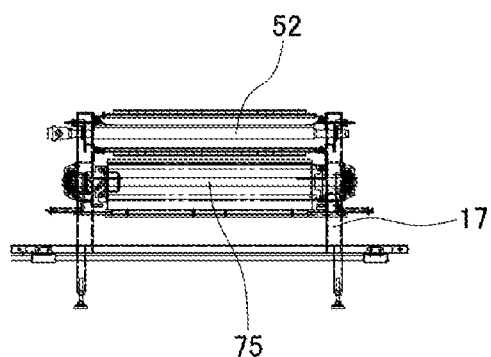
FIG. 2A is a diagram viewed in a direction of an arrow X of FIG. 1B.

Hereinafter, a description will be given of a griddle device corresponding to an embodiment to which a bread conveying apparatus of the invention is applied, that is, a bread baking apparatus 1 with reference to drawings. In the drawings, the same portion is indicated by the same reference numeral. An embodiment described below is described as an example, and does not restrict the invention.

Figure 2B:
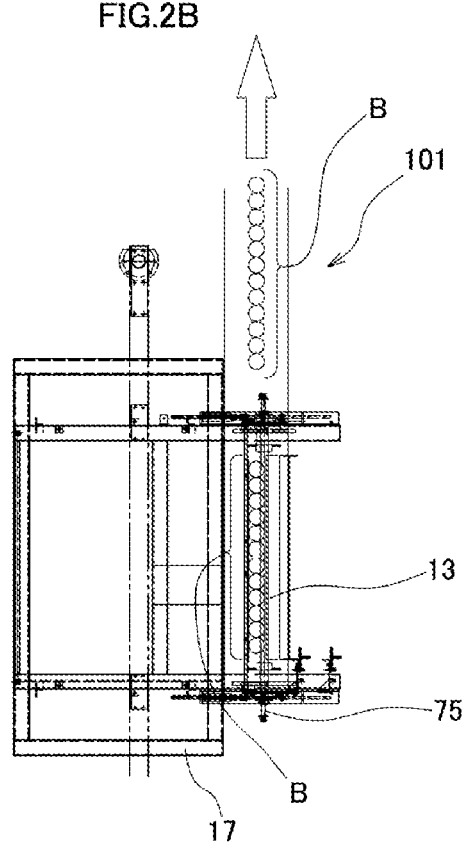
FIG. 2B is a plan view illustrating a portion of the bread baking apparatus illustrated in FIGS. 1A and 1B.
Figure 3A:
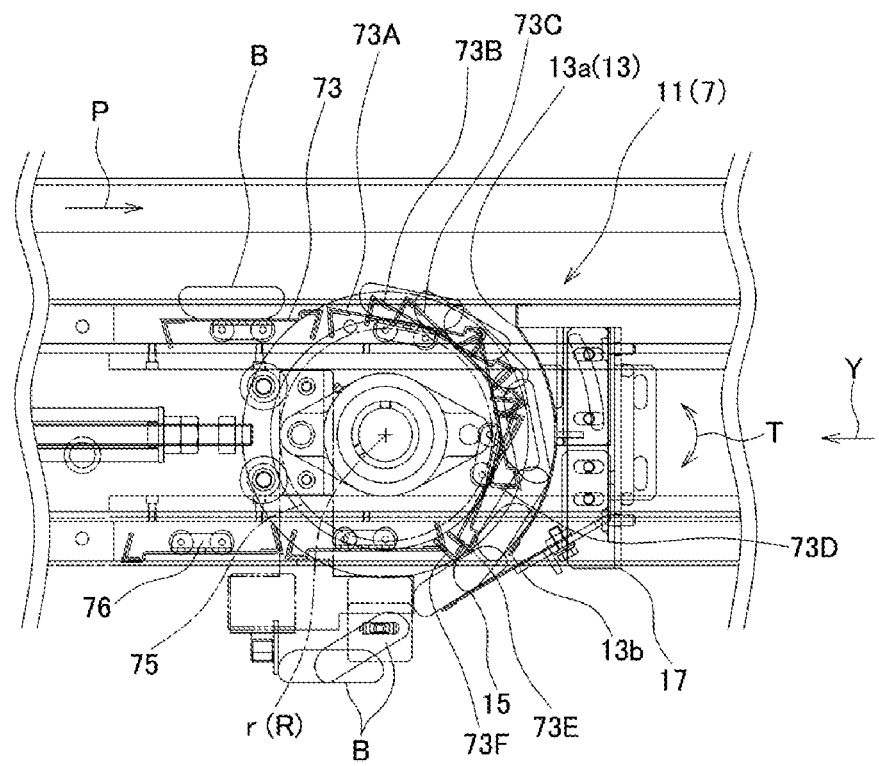
FIG. 3A is an enlarged partial front view enlarging and illustrating a discharge mechanism of a bread conveying apparatus incorporated in the bread baking apparatus illustrated in FIGS. 1A and 1B.
Figure 3B:
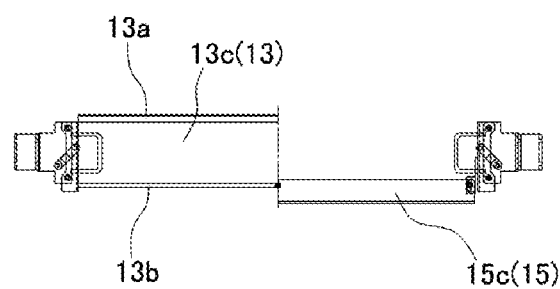
FIG. 3B is a diagram obtained by viewing FIG. 3A in a direction of an arrow Y.

FIG. 1A is a plan view of the bread baking apparatus 1 corresponding to an embodiment of the invention, and FIG. 1B is a front view of the bread baking apparatus 1 corresponding to the embodiment of the invention. FIG. 2A is a diagram viewed in a direction of an arrow X of FIG. 1B, and FIG. 2B is a plan view illustrating a portion of the bread baking apparatus 1 illustrated in FIGS. 1A and 1B. FIG. 3A is an enlarged partial front view enlarging and illustrating a discharge mechanism 11 of a hearth plate conveyor 7 corresponding to a bread conveying apparatus incorporated in the bread baking apparatus 1 illustrated in FIGS. 1A and 1B, and FIG. 3B is a diagram obtained by viewing FIG. 3A in a direction of an arrow Y. Further, FIG. 4A is a front view of a guide member 13, FIG. 4B is a side view illustrating a portion of the guide member 13, and FIG. 4C is a plan view illustrating a portion of the guide member 13. FIG. 5A is a front view of a chute member 15, and FIG. 5B is a partial side view of the chute member 15. FIG. 6A is a front view of a hearth plate 73, and FIG. 6B is a plan view of the hearth plate 73.

In FIG. 2A, a top plate conveyor 3 is omitted, and only a cup plate conveyor 5 and the hearth plate conveyor 7 are illustrated. In addition, FIG. 3A illustrates the hearth plate 73 and bread B as though a plurality of hearth plates 73 and pieces of bread B overlap with each other. However, an object of the illustration is to indicate a moving trajectory obtained when the hearth plate 73 and the bread B revolve around a downstream rotating body 75. In the present embodiment, along a conveying direction P, the hearth plate 73 and the bread B do not overlap with each other in the conveying direction P. In addition, in FIG. 3A, for the sake of clearness of the figure, an endless revolving body 76 is intermittently illustrated. In FIG. 3B, the guide member 13 and the chute member 15 are cut at a center of the hearth plate conveyor 7 in a width direction thereof, and halves thereof are illustrated, respectively.

As illustrated in FIGS. 1A and 1B, a griddle for baking bread dough, that is, the bread baking apparatus 1 extends in a left-right direction of the figures. The bread baking apparatus 1 includes three pieces of bread conveying apparatus, and the top plate conveyor 3, the cup plate conveyor 5, and the hearth plate conveyor 7 are disposed from an upper side to a lower side of FIG. 1B. Bread dough fermented by a proofer device (not illustrated) in a previous process is transferred to the cup plate conveyor 5, and the bread dough is conveyed from a right side to a left side in FIGS. 1A and 1B.

The top plate conveyor 3 includes a bread dough locking member, and travels in the same direction as that of the cup plate conveyor 5 (the left direction in FIG. 1B). The bread dough locking member travels such that the bread dough locking member is positioned immediately above a cup plate (not illustrated) of the cup plate conveyor 5, and a swelling degree (upward dimensions of FIG. 1B) is adjusted when bread dough B held by the cup plate included in the cup plate conveyor 5 is baked.

Further, when the bread dough held on the cup plate conveyor 5 arrives at a position around a left end rotating body 51 from a right end rotating body 52 of the cup plate conveyor 5, the bread dough falls onto the hearth plate 73 (see FIGS. 6A and 6B) included in the hearth plate conveyor 7 disposed immediately below the cup plate conveyor 5.

The hearth plate conveyor 7 includes a downstream rotating body 75 disposed on a downstream side along the conveying direction P, an upstream rotating body 71 disposed on an upstream side, and the endless revolving body 76 wound around the downstream rotating body 75 and the upstream rotating body 71.

Two endless revolving bodies 76 are separately disposed in a vertical direction of FIG. 1A (that is, a depth direction of FIG. 1B). A pair of separately disposed endless revolving bodies 76 are connected to each other by a connecting member (not illustrated) that connects both the endless revolving bodies 76, and a plurality of connecting members are disposed at equal intervals in a circumferential direction of the pair of endless revolving bodies 76. The hearth plate 73 corresponding to a plate-shaped member is disposed in this connecting portion. The hearth plates 73 are disposed at equal intervals in the circumferential direction between the pair of endless revolving bodies 76. An interval between the hearth plates 73 or dimensions of the hearth plate 73 may be appropriately changed according to a type, dimensions, etc. of an object to be conveyed.

Bread dough placed on the hearth plate 73 of the hearth plate conveyor 7 is conveyed in the conveying direction P from the upstream rotating body 71 side to the downstream rotating body 75 side in FIG. 1B. The bread dough is baked in this feeding course (course from the upstream rotating body 71 side to the downstream rotating body 75 side in FIGS. 1A and 1B). Heating means 91 for baking is disposed on a lower surface side of the hearth plate 73 of the hearth plate conveyor 7.

When the hearth plate 73 traveling the feeding course passes through the downstream rotating body 75 and arrives at a returning course (course from the downstream rotating body 75 side to the upstream rotating body 71 side in FIGS. 1A and 1B), the bread B placed on the hearth plate 73 is reversed and transferred to a belt conveyor 101 for transporting the bread B to a subsequent process (an arrow direction of FIG. 2B).

In addition, heating means 91 having the same configuration as that of the heating means 91 disposed on the lower surface side of the hearth plate 73 is disposed on a lower surface side of the cup plate, which holds bread dough, of the cup plate conveyor 5. Therefore, one surface of bread dough is baked while the bread dough is conveyed by the cup plate. In addition, when the bread dough is transferred from the cup plate to the hearth plate 73, the bread dough is turned over. Further, the other surface of the bread dough is baked while the bread dough is conveyed by the hearth plate 73, and baking of front and rear surfaces of the bread B is completed.

Hereinafter, a description will be given of the discharge mechanism 11 which is disposed on the downstream rotating body 75 side of the hearth plate conveyor 7. The discharge mechanism 11 mainly includes the hearth plate 73, the guide member 13, and the chute member 15. The hearth plate 73 is a member included in the hearth plate conveyor 7 described above.

As illustrated in FIG. 6A, with regard to the conveying direction P, the hearth plate 73 includes an upstream edge portion 73a on an upstream side, a downstream edge portion 73b positioned on a downstream side, and a flat portion 73c that connects the upstream edge portion 73a to the downstream edge portion 73b. The downstream edge portion 73b extends upward in FIG. 6A in a direction perpendicular to the flat portion 73c from one end portion of the flat portion 73c which is flat. Therefore, the downstream edge portion 73b may regulate movement of the bread B with regard to a downstream side in the conveying direction P.

The guide member 13 and the chute member 15 are fixed to a housing 17 to face the hearth plate 73 when the hearth plate 73 passes round the downstream rotating body 75. The guide member 13 has a radius curvature which is larger than an outer diameter dimension of the downstream rotating body 75, and the guide member 13 is positioned such that a center of curvature R thereof is identical to a center of rotation r of the downstream rotating body 75. Therefore, the hearth plate 73 travels inside a substantially arc-shaped space defined by the downstream rotating body 75, the guide member 13, and the chute member 15 in front view of FIG. 3A.

The guide member 13 includes an upper end portion 13a disposed on a feeding course side of the endless revolving body 76, a lower end portion 13b disposed on a returning course side of the endless revolving body 76, and an arc-shaped portion 13c which connects the upper end portion 13a to the lower end portion 13b and has a concave shaped surface. A support 55 is connected to the arc-shaped portion 13c such that the support 55 extends perpendicular to the arc-shaped portion 13c in planar view of FIG. 4C. An arc-shaped hole 69, which is convex rightward in front view illustrated in FIG. 4A, is provided in the support 55.

The support 55 is connected to a U-shaped member 65 having a U-shape in planar view illustrated in FIG. 4C. The U-shaped member 65 includes a flat base portion 65a, and a pair of side portions 65b and 65c extending in a direction perpendicular to the base portion 65a from both end portions of the base portion 65a separated in a transverse direction thereof (vertical direction of FIG. 4C). A circular fixing hole 74, to which fastening means 67 for fixing the support 55 is inserted, is provided in one side portion 65b. Therefore, the support 55 is fixed to the U-shaped member 65 when a bolt corresponding to the fastening means 67 is inserted into the arc-shaped hole 69 of the support 55 and the fixing hole 74, and fastened to a nut.

In the present embodiment, a center of curvature of the arc-shaped portion 13c (center of rotation r of the guide member 13) is coaxial with a center of curvature of the arc-shaped hole 69. The upper end portion 13a and the lower end portion 13b of the guide member 13 may be positioned when the support 55 is shifted in a direction of an arrow T along the arc-shaped hole 69 and fixed by the fastening means.

Further, an L-shaped member 61, which has an L-shape in planar view of FIG. 4C, is fixed to the other side portion 65c of the U-shaped member 65 by fastening members 66. The other side portion 65c is engraved with two horizontal slots 68 which extend in a horizontal direction and are separated from each other in a vertical direction in front view of FIG. 4A. In addition, the L-shaped member 61 is engraved with two circular and horizontal fixing holes 70 into which bolts corresponding to the fastening members 66 penetrate. The L-shaped member 61 and the U-shaped member 65 are fixed when the bolts corresponding to the fastening members 66 are inserted into the horizontal slots 68 and the horizontal fixing holes 70 and fixed by nuts. In addition, the guide member 13 may be positioned with respect to the L-shaped member 61 in a direction of an arrow D when the U-shaped member 65 is fixed in a state in which the U-shaped member 65 is relatively moved in the direction of the arrow D with respect to the L-shaped member 61 by the fastening members 66 along the horizontal slots 68.

As described above, in FIG. 1A, the guide member 13 may be adjusted in the direction of the arrow D and the direction of the arrow T. FIGS. 4B and 4C only illustrate a structure of a left portion of the guide member 13 and a member around the left portion. A right portion of the guide member 13 and a member around the guide member 13 is merely different from the left portion in that the right portion is symmetrical to the left portion, and a structure thereof is the same as that of the left portion. The bread B slides on the arc-shaped portion 13c of the guide member 13 having the above configuration, and finally arrives at the lower end portion 13b.

As illustrated in FIGS. 5A and 5B, the chute member 15 is engraved with two circular holes, into which bolts corresponding to fastening members 57 can be inserted, on both right and left sides of an upper end portion 15a thereof. Only a structure of a left portion of the chute member 15 and a member around the chute member 15 is illustrated in the figure. A right portion of the chute member 15 and a member around the chute member 15 is merely different from the left portion thereof in that the right portion is symmetrical to the left portion, and a structure thereof is the same as that of the left portion.

A chute fixing portion 60 for supporting the upper end portion 15a is connected to the L-shaped member 61 through a main chute fixing body 62 described below. The chute fixing portion 60 is engraved with a slot 60a extending in a vertical direction in FIG. 5B, and dimensions thereof are set to allow insertion of the bolt corresponding to the fastening member 57. The chute member 15 is fixed to the chute fixing portion 60 when the bolt corresponding to the fastening member 57 is inserted into the circular hole and the slot 60a, and the bolt is fastened to a nut. The chute member 15 may be positioned with respect to the chute fixing portion 60 when the chute member 15 is fixed in a state in which the chute member 15 is relatively moved in a vertical direction of FIG. 5B with respect to the chute fixing portion 60 by the fastening member 57 along the slot 60a.

In addition, the main chute fixing body 62 includes two horizontal slots 63 extending in a horizontal direction in FIG. 5A, and the horizontal slots 63 are separated from each other in a vertical direction. Meanwhile, a circular hole 72, which has a circular shape and has a dimension set to allow insertion of a bolt corresponding to a fastening member 64, is provided in the L-shaped member 61. The L-shaped member 61 and the main chute fixing body 62 are fixed by the fastening member 64 through the horizontal slot 63 of the L-shaped member 61 and the circular hole 72 of the main chute fixing body 62. The main chute fixing body 62 may be positioned with respect to the L-shaped member 61 along a lengthwise direction of the horizontal slot 63 of the L-shaped member 61 (the direction of the arrow D). In the present embodiment, the chute fixing portion 60 and the main chute fixing body 62 are configured from one component.

As described above, the chute member 15 may be positioned with respect to the L-shaped member 61 such that the chute member 15 is adjustable in the direction of the arrow D and a direction of an arrow E of FIG. 5A. The L-shaped member 62 is fixed to the housing 17. Further, a U-shaped holding portion 53 to be held by a user is mounted to the L-shaped member 62.

In FIGS. 3A and 3B, hearth plates 73A to 73F illustrate a moving trajectory of the hearth plate 73. At a position of the hearth plate 73C, the bread B is abutted to the downstream edge portion 73b (see FIG. 6A). At the time of arriving at a position of the hearth plate 73D, the bread B is supported by the downstream edge portion 73b and the arc-shaped portion 13c of the guide member 13. When the bread B goes beyond the lower end portion 13b and is separated from the guide member 13, a restraint of the bread B on a downmost-stream end portion by the downstream edge portion 73b and the guide member 13 is released, and the bread B is transferred to an inner surface 15c of the chute member 15. That is, positions at which the bread B is restrained and released may be set by setting a shortest distance between the downstream edge portion 73b and the arc-shaped portion 13c of the guide member 13 to be smaller than a thickness dimension of the bread B (a dimension in a vertical direction of FIG. 6A).

In addition, a position at which a nipping state is released is defined by the guide member 13 and the downstream edge portion 73b, and thus the bread B may be stably supplied to a predetermined position on the inner surface 15c of the chute member 15. As a result, the bread B is stably transferred to the belt conveyor 101 of the subsequent process through the chute member 15. The inner surface 15c of the chute member 15 extends in a shape of a straight line, and thus the bread B smoothly slides on the inner surface 15c, and is transported to the subsequent process.

In addition, in the present embodiment, the chute fixing portion 60 and the main chute fixing body 62 are configured from one component, and adjusting means for adjusting a tilt angle of the chute member 15 (an angle at which the inner surface 15c of the chute member 15 extends with respect to the horizontal direction) is not included. However, it is possible employ a configuration in which the tilt angle can be changed. In the case of this configuration, the tilt angle may be adjusted in consideration of impact received by bread when the bread falls onto a placed portion, on which bread is placed, of a belt conveyor of a subsequent process, sliding characteristics of bread on the inner surface 15c, and etc.

The present embodiment corresponds to a configuration having a positional relation in which the center of curvature R of the guide member 13 is identical to the center of rotation r of the downstream rotating body 75. However, the invention is not restricted to this configuration. For example, when the guide member 13 and the downstream rotating body 75 are configured such that the center of curvature R and the center of rotation r can relatively move, it is possible to change a shortest distance between the hearth plate 73 and the guide member 13 included in the substantially arc-shaped space, and to increase a design freedom of a position at which the bread B is restrained and a position at which the restraint is released according to a thickness dimension, etc. of the bread. As described above, the bread B is smoothly and reliably transferred to the subsequent process by adopting a configuration in which the guide member 13 and the chute member 15 can be positioned independently of each other.

In the present embodiment and a modified example, bread dough and bread are used as an object to be conveyed of the bread conveying apparatus. The bread conveying apparatus of the invention is incorporated in the bread baking apparatus 1. However, the conveying apparatus of the invention is not restricted to the bread baking apparatus, and may be used in various apparatus that process food.

Hereinbefore, the embodiment of the invention has been described. However, the invention is not restricted to the embodiment, and may be variously modified and changed within a range of a subject matter thereof.

This application claims the benefit of Japanese Patent Application No. 2017-045513, filed Mar. 10, 2017, which is hereby incorporated by reference herein in its entirety.

What is claimed is:

1. A bread conveying apparatus for conveying bread having a pair of wide faces and a narrow face connecting the pair of wide faces, the narrow face having a length less than the pair of wide faces, the bread conveying apparatus comprising:
   a conveyor device that has a pair of rotating bodies, a plurality of containers on which one of the pair of wide faces of the bread is placed, and an endless revolving body wound around the pair of rotating bodies, the plurality of containers being separated from each other and being mounted on the endless revolving body, and that conveys the containers in a conveying direction, the plurality of containers including:
   an upstream edge portion extending radially towards the endless revolving body in a front view and being located at an upstream side in the conveying direction; and
   a downstream edge portion including a regulating portion extending radially outwardly relative to the endless revolving body and a projecting portion extending radially toward the endless revolving body, the regulating portion retaining movement of the bread toward a downstream side in the conveying direction;
   a guide member supporting an other one of the pair of wide faces and disposed on a downstream end portion side of the conveyor device in the conveying direction to restrain movement of the bread toward the downstream side in the conveying direction in cooperation with the downstream edge portion, the downstream edge portion being placed at the downstream side in the conveying direction;
   a chute member that supports the other one of the pair of wide faces of the bread conveyed by the conveyor device to make the other one of the pair of wide faces slide on the chute member and that discharges the bread to fall outside of the chute member; and
   a restraint release area which is a space defined by a lower end portion of the guide member placed at the downstream side in the conveying direction of the guide member and a chute end portion of the chute member, the chute end portion being closest to the lower end portion of the guide member,
   wherein, when the bread, in which the narrow face of the bread is restrained by the downstream edge portion and the other one of the pair of wide faces is restrained by the guide member, arrives at the restraint release area, restraint of the bread by the downstream edge portion and the guide member is released so that the other one of the pair of wide faces of the bread is transferred to and slided on the chute member to fail outside of the chute member.

2. The conveying apparatus according to claim 1, wherein the guide member is capable of being adjusted in an arc-shaped direction along a rotating direction of a downstream rotating body disposed on a downstream side in the conveying direction in the pair of rotating bodies.

3. The conveying apparatus according to claim 2, wherein the chute member is inclined with respect to a vertical direction which is a direction that passes a center of rotation of a downstream rotating body disposed on the downstream side of the pair of rotating bodies in the conveying direction, and
   wherein the chute member is capable of being adjusted in a horizontal direction with respect to the chute end portion of the chute member.

4. The conveying apparatus according to claim 2, wherein a center of curvature of the guide member is shifted from a center of curvature of a downstream rotating body disposed on the downstream side of the pair of rotating bodies, and a distance between one end portion of the guide member and the endless revolving body is set to a smaller dimension than a distance between an other end portion of the guide member and the endless revolving body.

5. The conveying apparatus according to claim 2, wherein the guide member extends in an arc shape outside of a downstream rotating body in a radial direction.

6. The conveying apparatus according to claim 1, wherein the chute member is inclined with respect to a vertical direction which is a direction that passes a center of rotation of a downstream rotating body disposed on the downstream side of the pair of rotating bodies in the conveying direction, and
   wherein the chute member is capable of being adjusted in a horizontal direction with respect to the chute end portion of the chute member.

7. The conveying apparatus according to claim 1, wherein a center of curvature of the guide member is shifted from a center of curvature of a downstream rotating body disposed on the downstream side of the pair of rotating bodies, and a distance between one end portion of the guide member and the endless revolving body is set to a smaller dimension than a distance between an other end portion of the guide member and the endless revolving body.

8. The conveying apparatus according to claim 7, wherein the center of curvature of the guide member is positioned above the center of curvature of the downstream rotating body in a vertical direction.

9. The conveying apparatus according to claim 1, wherein the bread is conveyed in a horizontal direction by the endless revolving body in a state where the conveying apparatus is operated.

10. The conveying apparatus according to claim 1, further comprising:
- a second conveyor device located directly above the conveyor device,
- wherein the second conveyor device includes:
    - a pair of second rotating bodies;
    - a cup-shaped container in which the bread is to be contained; and
    - a second endless revolving body wound around the pair of second rotating bodies, on which second endless revolving body the cup-shaped container is mounted, the second endless revolving body conveying the cup-shaped container in an opposite direction opposed to the conveying direction,
- wherein, when the second endless revolving body revolves around one of the pair of second rotating bodies at the upstream side in the conveying direction to reverse the cup-shaped container, the bread in the cup-shaped container falls on one of the plurality of the containers.

* * * * *